(12) United States Patent
Nakano

(10) Patent No.: US 7,213,983 B2
(45) Date of Patent: May 8, 2007

(54) SECTOR DRIVE APPARATUS FOR USE IN OPTICAL APPARATUS

(75) Inventor: Takashi Nakano, Chiba (JP)

(73) Assignee: Seiko Precision Inc., Narashino-Shi, Chiba (JP)

( * ) Notice: Subject to any disclaimer, the term of this patent is extended or adjusted under 35 U.S.C. 154(b) by 0 days.

(21) Appl. No.: 11/366,856

(22) Filed: Mar. 1, 2006

(65) Prior Publication Data

US 2006/0159446 A1    Jul. 20, 2006

Related U.S. Application Data

(63) Continuation of application No. PCT/JP2004/012099, filed on Aug. 24, 2004.

(30) Foreign Application Priority Data

Sep. 1, 2003    (JP)    ............... 2003-308181

(51) Int. Cl.
  *G03B 9/10*    (2006.01)
  *G03B 9/14*    (2006.01)
(52) U.S. Cl. .................... 396/493; 396/497
(58) Field of Classification Search ........... 396/488, 396/493, 494, 497, 500, 501, 510, 452, 505
  See application file for complete search history.

(56) References Cited

U.S. PATENT DOCUMENTS 3,628,438 A * 12/1971 Loseries ............ 396/487

FOREIGN PATENT DOCUMENTS

| JP | 49-63956 | 5/1974 |
|---|---|---|
| JP | 55-172915 | 11/1980 |
| JP | 62-20828 Y2 | 5/1987 |
| JP | 63-36227 A | 2/1988 |
| JP | 2591786 | 1/1999 |
| JP | 2002-139768 | 5/2002 |

OTHER PUBLICATIONS

International Search Report for PCT/JP2004/012099, dated Oct. 19, 2004.

* cited by examiner

*Primary Examiner*—W. B. Perkey
*Assistant Examiner*—Rishi S. Suthar
(74) *Attorney, Agent, or Firm*—Michaud-Duffy Group LLP

(57) ABSTRACT

A sector drive apparatus for use in an optical apparatus, the sector drive apparatus includes a sector having a first engagement opening engaged with an operation member that reciprocates in a given range and a second engagement opening engaged with a spindle fixed to a shutter substrate, the sector opening and closing a shutter opening formed in the shutter substrate in accordance with a movement of the operation member. The operation member has an engagement pin that is engaged in the first engagement opening, the first engagement opening is substantially circular that permits the operation member to rotate, and the second engagement member is an elongate opening, and swings the sector centering around the spindle to move to a position where the shutter opening is opened and closed, when the first engagement opening moves in accordance with the movement of the operation member.

10 Claims, 6 Drawing Sheets

FULLY OPEN

FULLY CLOSE

SMALL APERTURE

PRIOR ART

SECTOR DRIVE APPARATUS FOR USE IN OPTICAL APPARATUS

CROSS-REFERENCE TO RELATED APPLICATIONS

This application is a continuation of and claims priority to International Patent Application No. PCT/JP2004/012099 filed on Aug. 24, 2004, which claims priority to Japanese Patent Application Nos. 2003-308181 filed on Sep. 1, 2003, subject matter of these patent documents is incorporated by reference herein in its entirety.

BACKGROUND OF THE INVENTION

1. Field of the Invention

This invention generally relates to sector drive apparatuses for use in optical apparatuses, and more particularly, to a sector drive apparatus for use in an optical apparatus such as a digital camera housed in a mobile telephone, a camcorder, or the like.

2. Description of the Related Art

In recent years, cameras have been downsized at a remarkable speed, and the shutter speed has been increased. In order to downsize the camera and increase the shutter speed, there is a need that internal parts have to be more compact and efficiently configured. For instance, Japanese Patent Application Publication 2002-139768 (hereinafter, referred to as Document 1) discloses the sector drive apparatus in which the shapes of sectors are formed small and multiple sectors operate together to close the shutter opening. With such sector drive apparatus, it is possible to promote downsizing.

FIG. 6A and FIG. 6B show the conventional sector drive apparatus disclosed in Document 1. FIG. 6A shows a shutter opening 10a in a fully open state. FIG. 6B shows a state in process of closing the shutter opening 10a. In this sector drive apparatus, three sectors 121, 122, and 130 are rotatably provided on a shutter substrate 110. The sectors 121 and 122 are aperture blades and the sector 130 is a shutter blade. The aperture blades 121 and 122 are driven by an operation pin 141a simultaneously. These aperture blades overlap each other, and this makes it difficult to see the movements thereof. Hence, the shutter blade 130 is described, because the shutter blade 130 has a similar configuration and is composed of a single blade. It is therefore easier to see the movement of the shutter blade 130.

The shutter blade 130 includes a circular opening 131 and an elongate opening 132. The circular opening 131 is engaged with a spindle 113 fixed to the substrate. Therefore, the shutter blade 130 is pivotally provided about the spindle 113. An operation pin 151a is engaged with the elongate opening 132. The operation pin 151a is connected to a rotor 151 of the drive motor 150, and rotates within a given range. Accordingly, the shutter blade 130 rotates around the spindle 113 by means of the driving force of the operation pin 151a to open and close the shutter opening 10a.

The sector included in the conventional sector drive apparatus generally has two engagement openings as in the afore-described shutter blade 130. The first engagement opening 131 is engaged with the spindle 113 fixed to the shutter substrate 110. The second engagement opening 132 is engaged with the operation pin 151a. As shown in FIG. 6A and FIG. 6B, the opening 131 engaged with the spindle 113 fixed to the substrate is formed to have a shape of a perfect circle having an inner diameter slightly greater than the spindle. On the other hand, the opening 132 engaged with the operation pin 151a has a shape of an elongate hole. The operation pin 151a slides inside the opening 132 to transmit the driving force.

As shown in FIG. 6A and FIG. 6B, conventionally, the engagement opening 132 with which the operation pin 151a is engaged is formed to have a shape of an elongate hole. When the operation pin 151a internally slides the elongate opening 132, the shutter blade 130 rotates around the spindle 113 and moves within a range for opening and closing the shutter opening 10a.

Conventionally, the opening with which the operation pin is engaged has a shape of an elongate hole. Therefore, as shown in FIG. 6A and FIG. 6B, the elongate opening 132 provided in the sector needs to be designed in such a manner that the operation pin 151a is in contact with the inner wall thereof with no margin. Specifically, the elongate opening is designed to extend in a direction that crosses a moving direction of the operation pin 151a. The elongate opening 132 having a large area is arranged at a position away from the spindle 113, which is the rotation center of the sector. Therefore, when the sector rotates, a rotational area near the elongate opening 132 is large. Therefore, another spindle that is the rotation center of another sector needs to be situated to avoid the afore-mentioned rotational area. This makes it difficult to downsize the sector drive apparatus.

SUMMARY OF THE INVENTION

It is therefore an object of the present invention to provide a small-sized sector drive apparatus.

The afore-mentioned object can be achieved by a sector drive apparatus for use in an optical apparatus, the sector drive apparatus including: a sector having a first engagement opening engaged with an operation member that reciprocates in a given range and a second engagement opening engaged with a spindle fixed to a shutter substrate, the sector opening and closing a shutter opening formed in the shutter substrate in accordance with a movement of the operation member. The operation member has an engagement pin that is engaged in the first engagement opening; the first engagement opening is substantially circular that permits the operation member to rotate; and the second engagement member is an elongate opening, and swings the sector centering around the spindle to move to a position where the shutter opening is opened and closed, when the first engagement opening moves in accordance with the movement of the operation member.

Similarly, the afore-mentioned object can also be achieved by a sector drive apparatus for use in an optical apparatus, the sector drive apparatus including: multiple sectors, each of said multiple sectors having a first engagement opening engaged with an operation member that reciprocates in a given range and a second engagement opening engaged with a spindle fixed to a shutter substrate, said multiple sectors opening and closing a shutter opening formed in the shutter substrate in accordance with a movement of the operation member. The operation member has an engagement pin that is engaged in the first engagement opening; the first engagement opening of at least one of said multiple sectors is substantially circular that permits the operation member to rotate; and the second engagement member is an elongate opening, and swings the sector centering around the spindle to move to a position where the shutter opening is opened and closed, when the first engagement opening moves in accordance with the movement of the operation member.

Further, the afore-mentioned object can also be achieved by an optical apparatus including the afore-described sector drive apparatus.

In accordance with the present invention, provided are the elongate opening that has a large area near the rotation center of the sector and the engagement opening that does not need such a large area to be engaged with the operation member. This enables the rotational area to be smaller necessary for rotating the sector. Accordingly, the rotation centers of other sectors can be arranged closer, enabling the sector drive apparatus to be downsized. The sector is made to move in a desired trajectory instead of a simple circular motion, by arranging the elongate opening in an appropriate shape. It is thus possible to make the rotational area of the sector smaller, thereby contributing to the downsizing of the sector drive apparatus.

Preferably, all the sectors are driven by a single operation member. With this configuration, it is possible to provide the efficient sector drive apparatus in which a single operation member can drive all the sectors.

In accordance with the present invention, the sector drive apparatus can be downsized.

BRIEF DESCRIPTION OF THE DRAWINGS

Preferred embodiments of the present invention will be described in detail with reference to the following drawings, wherein.

DESCRIPTION OF THE PREFERRED EMBODIMENTS

Figure 1:
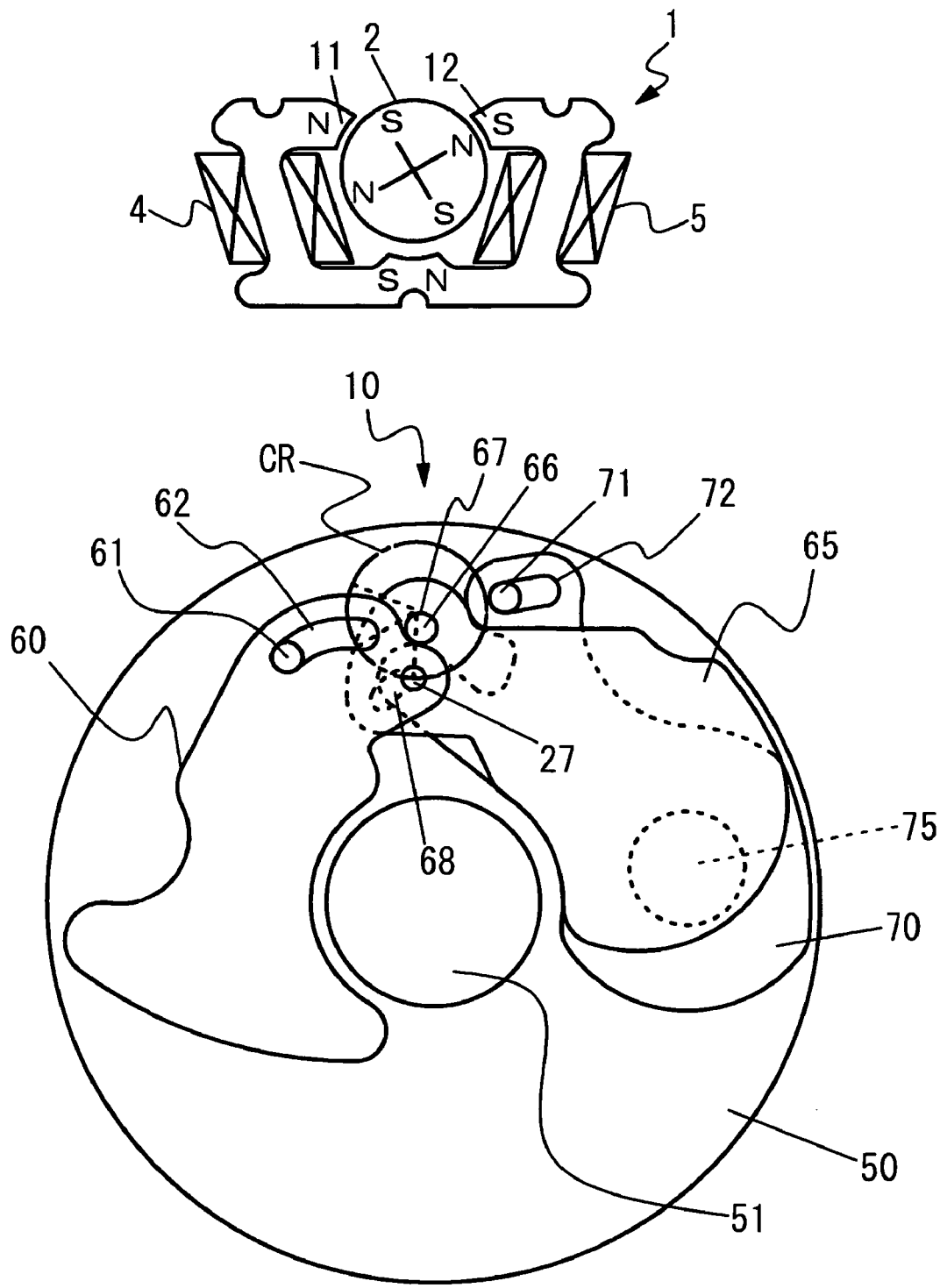
FIG. 1 is a view showing sectors in a fully open state in a sector drive apparatus.
Figure 3A:
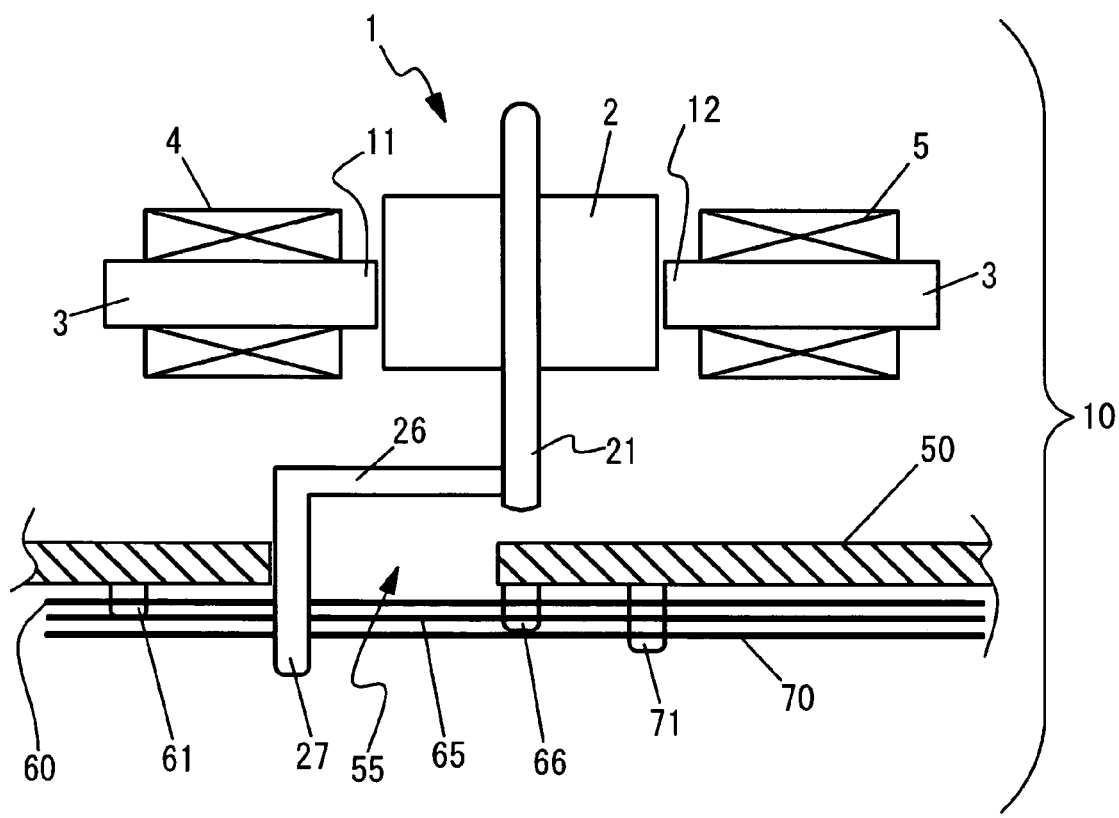
FIG. 3A and FIG. 3B show the whole configuration including a drive mechanism.
Figure 3B:
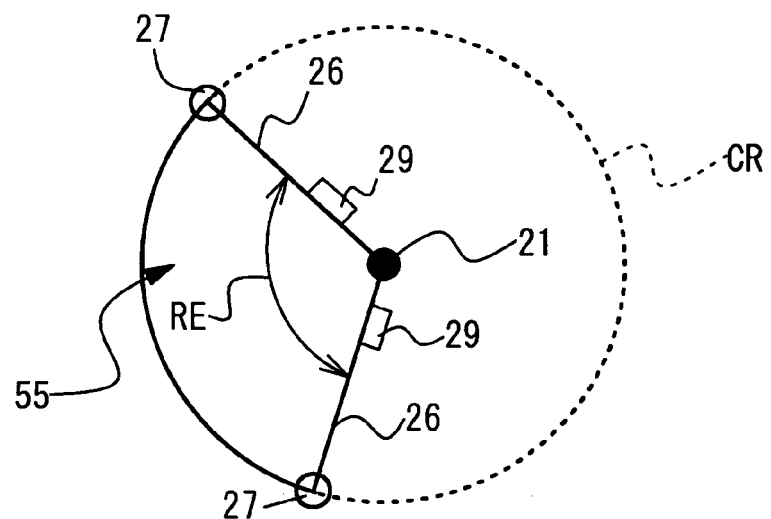
Figure 4:
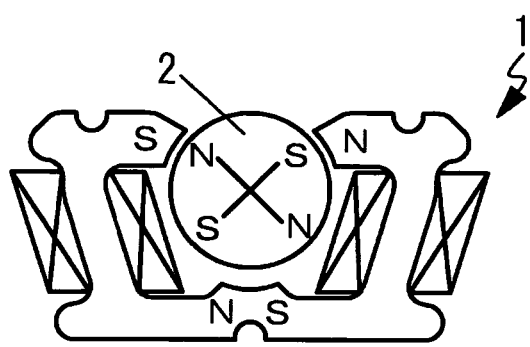
FIG. 4 is a view showing the sector drive apparatus in a fully closed state.
Figure 4:
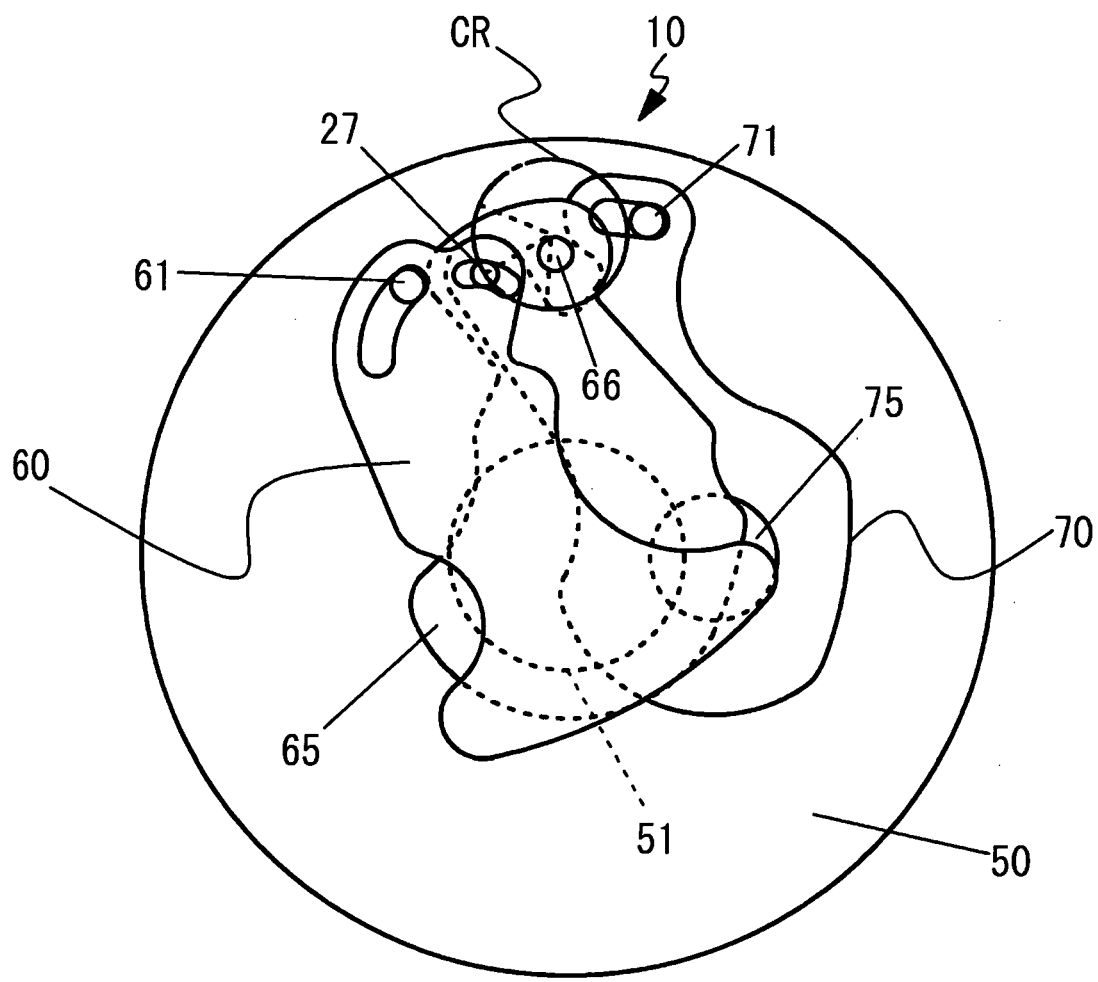
Figure 5:
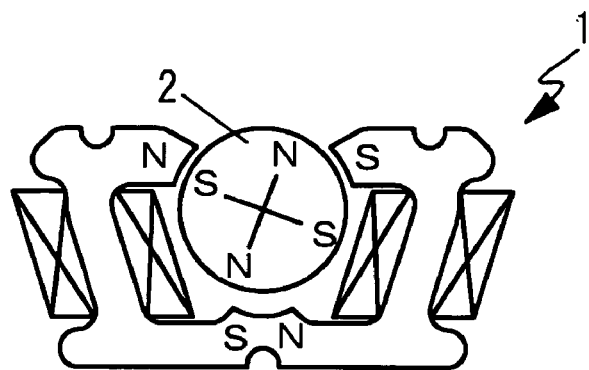
FIG. 5 is a view showing the sector drive apparatus in a small aperture state.
Figure 5:
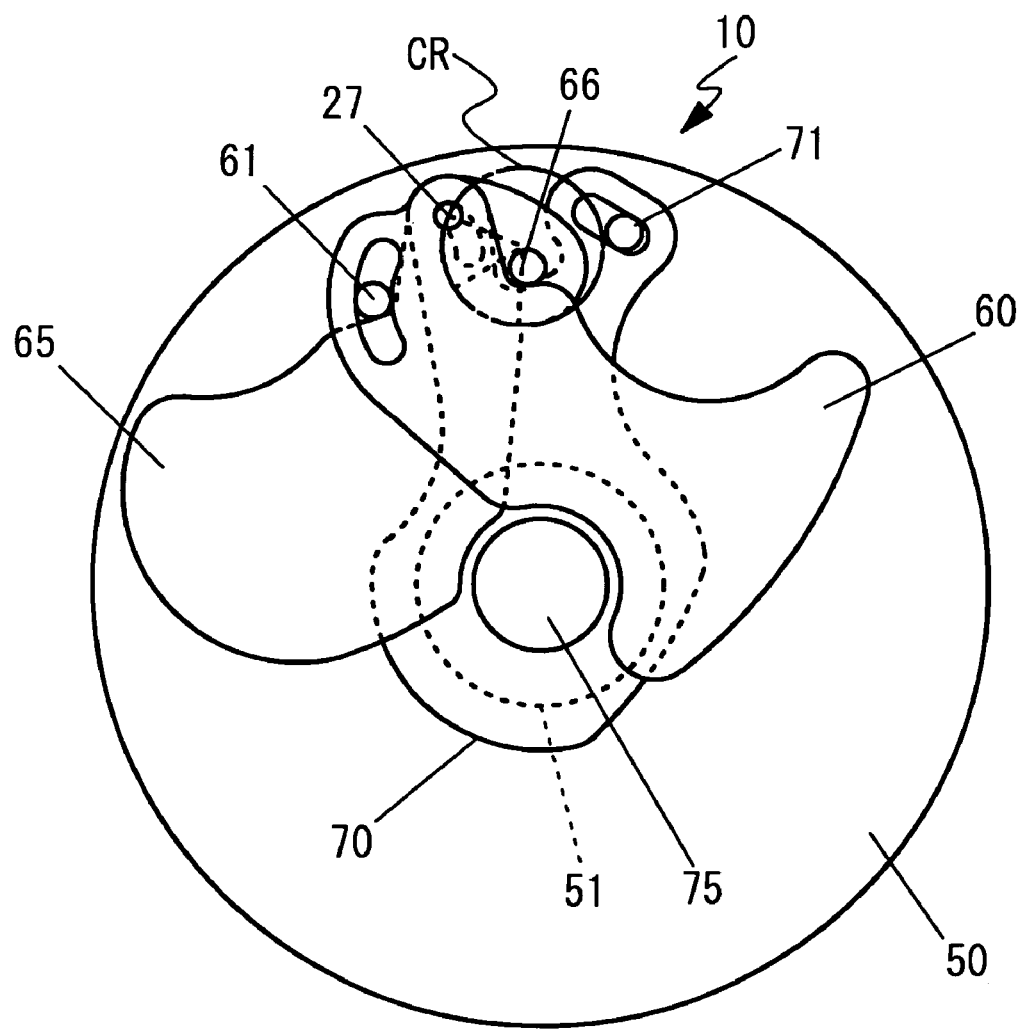
Figure 6A:
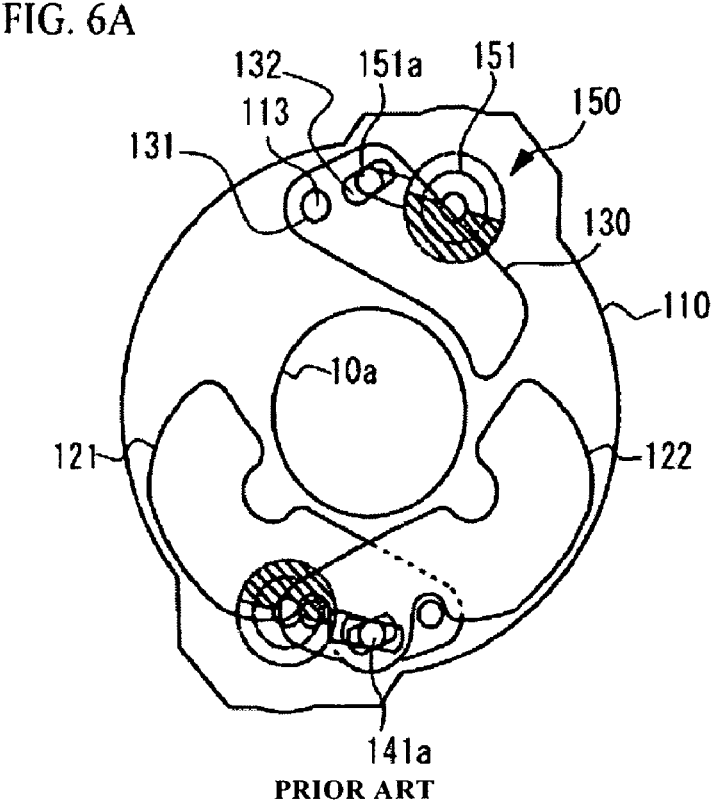
FIG. 6A and FIG. 6B show a conventional sector drive apparatus.
Figure 6B:
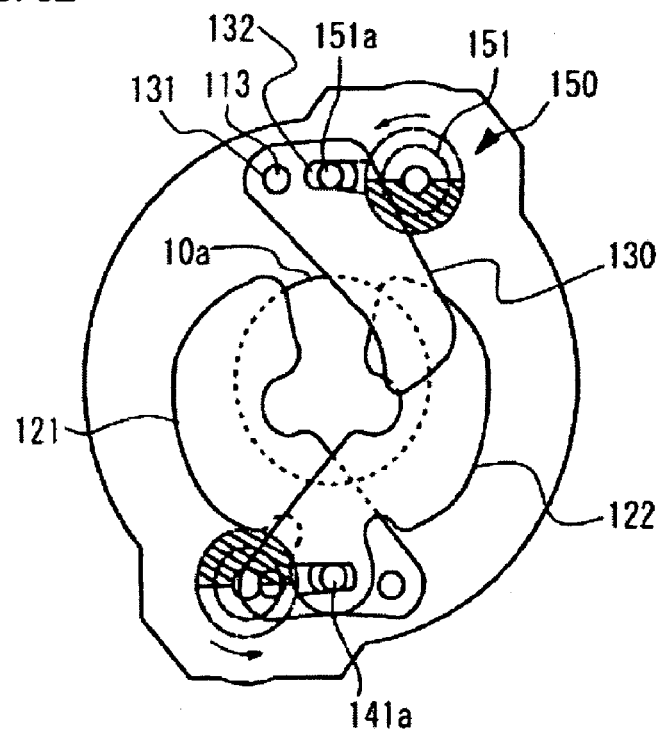

A description will now be given, with reference to the accompanying drawings, of a sector drive apparatus in accordance with embodiments of the present invention. FIG. 1 through FIG. 5 show a sector drive apparatus 10 in accordance with embodiments of the present invention. FIG. 1 is a view showing sectors in a fully open state in the sector drive apparatus 10. On the upper side of the figure, the state of a stepping motor 1 is also shown as an example of a drive portion that drives the respective sectors. FIG. 2A through FIG. 2D show portions of the structure included in the sector drive apparatus 10 shown in FIG. 1. FIG. 3A and FIG. 3B show the whole configuration including a drive mechanism of the sector drive apparatus 10. FIG. 4 is a view showing the sector drive apparatus 10 in a fully closed state. FIG. 5 is a view showing the sector drive apparatus 10 in a small aperture state.

First, referring to a lower figure in FIG. 1, sectors included in the sector drive apparatus are described. The sector drive apparatus 10 includes three sectors. The sector drive apparatus 10 includes a shutter substrate 50 and three sectors 60, 65, and 70. The sector 60 is a first shutter blade, and the sector 65 is a second shutter blade. The sector 70 is an aperture blade having a small aperture opening 75. A shutter opening 51 is formed in the center of the shutter substrate 50.

Figure 2A:
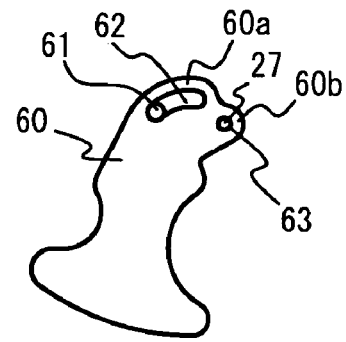
FIG. 2A through FIG. 2D show portions of the structure included in the sector drive apparatus.
Figure 2B:
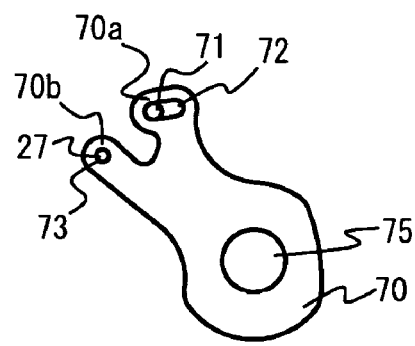
Figure 2C:
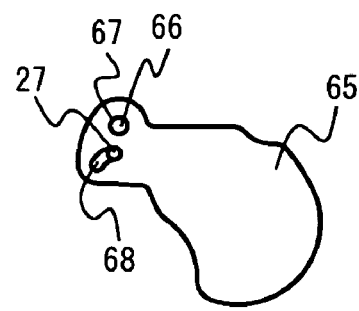
Figure 2D:
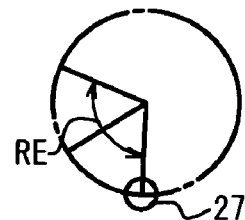

FIG. 2A through FIG. 2D are views showing the respective structures of the stepping motor 1 shown in FIG. 1. FIG. 2A shows the first sector 60, FIG. 2B shows the second sector 65, and FIG. 2C shows the third sector 70. FIG. 2D is an enlarged view of a given range RE in which an operation pin 27 moves as an operation member. The operation pin 27 is driven by the stepping motor 1. The relationship between the stepping motor 1 and the operation pin 27 and the relationship between the stepping motor 1 and the respective sectors to be moved by the operation pin will be described later in detail, with reference to FIG. 3A and FIG. 3B.

The shapes of the respective sectors are described, with reference to FIG. 2A through FIG. 2D. The sector drive apparatus 10 includes the first sector 60 and the third sector 70 respectively having engagement openings different from those in the conventional sector. First, the first sector 60 shown in FIG. 2A includes two engagement openings 62 and 63. The first engagement opening 63 is substantially circular and engaged with the operation pin 27. The engagement opening 63 has an inner diameter that is formed slightly greater than the operation pin 27, so that the operation pin 27 is rotatably provided therein. On the other hand, the second engagement opening 62 is formed to be an elongate opening having a curvature. A spindle 61 fixed to the substrate 50 is engaged with the elongate opening 62.

As described, the first sector 60 has the engagement openings provided in a reverse state from the conventional one. That is to say, the engagement opening 63 with which the operation pin 27 is engaged is formed to have a shape of a circle that permits the operation pin 27 to rotate. Also, the engagement opening 62 with which the spindle 61 is engaged is an elongate opening. Provided are the engagement opening 62 of an elongate hole that needs a large area and a thickness portion 60a that surrounds the engagement opening 62 near the spindle 61 of the rotation center. Also provided are the engagement opening 63 that needs only a small area and a thickness portion 60b that surrounds the engagement opening 63 near the operation pin 27. Hence, when the first sector 60 is made to rotate, an area necessary for rotating near the operation pin 27 is decreased, making it possible to arrange another spindle that is the rotation center of another sector to be closer by the decrease. Thus, it is possible to bring spindles, which are the rotation centers of the sectors, closer to each other and bring the sectors closer to each other, thereby enabling the whole apparatus to be downsized. Also, the engagement opening 62 is formed to have a curved shape as necessary. This allows the sector 60 to move around the spindle 61 in a rotational direction due to a simple rotary motion of the sector 60, and in addition, allows the sector 60 to move in a direction other than the rotational direction. The rotational area necessary for the rotational direction can be made smaller, thereby enabling the whole apparatus to be small-sized. The elongate opening 62 is designed to swing the sector 60 so as to open and close the shutter opening 51, when the engagement opening 63 moves according to the movement of the operation pin 27. The shape of the elongate opening 62 is configured to be curved or linear, as required, in consideration of an outer shape of the sector 60, so that the sector 60 moves efficiently to the position where the sector 60 opens and closes the shutter opening 51 in accordance with the movement of the operation pin 27. The operation pin 27 is not engaged with the elongate opening 62. This eliminates the restriction in design as seen in the conventional one, and realizes a flexible design of the shape.

FIG. 2B shows the third sector 70. The third sector 70 having the small aperture opening 75 has a same configuration as that of the first sector 60. That is to say, the third sector 70 includes two engagement openings 72 and 73. The first engagement opening 73 is substantially circular and engaged with the operation pin 27. On the other hand, the second engagement opening 72 is formed to be an elongate hole. A spindle 71 fixed to the substrate 50 is engaged with the elongate opening 72. The third sector 70 also has the engagement openings in a reverse state from the conventional one. Provided are the engagement opening 72 of an elongate hole that needs a large area and a thickness portion 70a that surrounds the engagement opening 72 near the spindle 71 of the rotation center. Also provided are the engagement opening 73 that needs only a small area and a thickness portion 70b that surrounds the engagement opening 73 near the operation pin 27. Hence, when the third sector 70 is made to rotate, an area necessary for rotating near the operation pin 27 is decreased. This makes it possible to arrange another spindle of the rotation center of another sector closer by the decrease. Thus, it is possible to bring spindles, which are the rotation centers of the sectors, closer to each other so as to bring the sectors closer to each other, thereby enabling the whole apparatus to be downsized. Also, the engagement opening 72 is formed to have a linear shape as necessary. This allows the sector 70 to move around the spindle 71 in a rotational direction due to a simple rotary motion of the sector 70 and to move in a direction other than the rotational direction. The rotational area that needs the rotational direction can be made smaller, thereby enabling the whole apparatus to be small-sized. Accordingly, when the engagement opening 73 moves according to a movement of the operation pin 27, the sector 70 rotates efficiently to move to a position where the sector 70 opens and closes the shutter opening 51.

Meanwhile, the second sector 65 shown in FIG. 2C is configured to have conventional engagement openings. That is to say, the second sector 60 includes two engagement openings 67 and 68. The first engagement opening 68 has a shape of an elongate hole, and is engaged with the operation pin 27. On the other hand, the second engagement opening 67 is formed to have a circular shape, and a spindle 66 fixed to the substrate 50 is engaged in the engagement opening 67. Hence, in accordance with the movement of the operation pin 27 in the elongate opening 68, the sector 65 swings and moves to a position where the shutter opening 51 is opened and closed.

As described heretofore, the sector drive apparatus 10 is configured to realize a small-sized sector drive apparatus by combining the first sector 60, the third sector 70 having the engagement openings arranged reversely from those of the conventional sector, and the second sector 65 having the conventional configuration of engagement openings. In the description hereafter, the drive portion included in the sector drive apparatus 10 will be shown and the operations of the sectors 60, 65, and 70 will be described.

FIG. 3A is a plan view of a whole structure of the sector drive apparatus 10. The sector drive apparatus 10 has the stepping motor 1 on the back side of the shutter substrate 50. The stepping motor 1 includes a rotor 2 and a stator 3. The rotor 2 is arranged in the center and rotatably provided in both directions. The stator 3 is arranged to face the outside of the rotor 2. The rotor 2 has a cylindrical shape, and has a circular shape at cross section. The stator 3 has a C-shaped planar shape and is integrally formed, and houses the rotor 2 in an internal space thereof. On the upper side of FIG. 1, the stepping motor 1 is shown in such a manner that open ends of C shape in the stator 3 face upwardly.

The rotor 2 has four magnetic poles, which include two North magnetic poles and two South magnetic poles. The rotor 2 is a permanent magnet where identical magnetic poles are positioned to face each other, and is rotatably provided around an axis 21 in both directions. Both ends of the stator 3 having the afore-described C shape are formed to face the circumferential surface of the rotor 2. These ends respectively serve as a first magnetic pole 11 and a second magnetic pole 12. A third magnetic pole 13 is arranged in an intermediate position between the first magnetic pole 11 and the second magnetic pole 12.

A first coil 4 is wound between the first magnetic pole 11 and the third magnetic pole 13, and a second coil 5 is wound between the second magnetic pole 12 and the third magnetic pole 13. The first magnetic pole 11 is magnetically excited when current is applied to the first coil 4, and the second magnetic pole 12 is magnetically excited when current is applied to the second coil 5. On the other hand, the third magnetic pole 13 is magnetically excited by both the first coil 4 and the second coil 5.

On the front side of the shutter substrate 50, the above-described three sectors 60, 65, and 70 are provided along the substrate surface. These sectors are a first shutter blade 60, a second shutter blade 65, and an aperture blade 70, from the shutter substrate side. The stepping motor 1 is positioned on the back side of the shutter substrate 50.

The openings cannot be confirmed in FIG. 3A, however, the first sector 60 includes the elongate opening 62 and the circular opening 63, the elongate opening 62 being engaged with the spindle 61 provided in the substrate 50, the circular opening 63 being engaged with the operation pin 27 that extends from the rotor 2. Similarly, the third sector 70 includes the elongate opening 72 and the circular opening 73, the elongate opening 72 being engaged with the spindle 71 provided in the substrate 50, the circular opening 73 being engaged with the operation pin 27 that extends from the rotor 2. Also, the second sector 65 includes the circular opening 67 and the elongate opening 68, the circular opening 67 being fit with the spindle 66 provided in the substrate 50, the elongate opening 68 being engaged with the operation pin 27 that extends from the rotor 2. These sectors 60, 65, and 70 respectively swing in trajectories, in accordance with the movement of the single operation pin 27.

An arm portion 26 that extends in a radial direction is connected to the rotor axis 21 provided on the back side of the substrate 50 in the stepping motor 1. The above-described operation pin 27 is connected to an end of the arm portion 26, and extends to an opposite side of the shutter substrate 50 through an opening 55 provided in the shutter substrate 50. FIG. 3B shows a moving trajectory CR of the operation pin 27, and corresponds to FIG. 2D. The operation pin 27 is capable of rotating at 360° according to the rotation of the rotor 2. However, the opening 55 formed in the substrate 50 has a fan shape and a member 29 that regulates the movement of the arm portion 26 is provided. Therefore, in accordance with the present embodiment of the present invention, the operation pin 27 rotates within the given range RE.

The operation having the above-described configuration is described, with reference to FIG. 1, FIG. 4, and FIG. 5. These figures show changes in the positions of the first sector 60, the second sector 65, and the third sector 70, when viewed from the front side of the shutter substrate 50. On the upper sides of the figures, the stepping motor 1 is shown so that the rotation state of the rotor 2 can be confirmed.

FIG. 1 shows the shutter opening 51 for image capturing provided in the substrate 50 in a fully open state. The rotor 2 in the stepping motor 1 has a rotation angle of 0°, yet is stopped on a slight tilt by the regulation member 29 (see FIG. 3B). The detent torque causes the South magnetic pole and the North magnetic pole respectively to move to the positions that face the first magnetic pole 11 and the second magnetic pole 12, yet they are retained in a state where they are regulated by the regulation member 29. Accordingly, it is possible to retain this state without applying current to the coils 4 or 5 in the state shown in FIG. 1.

FIG. 4 shows the shutter opening 51 for image capturing provided in the substrate 50 in a fully closed state. FIG. 4 shows a state where the rotor 2 rotates clockwise from the state shown in FIG. 1, and the operation pin 27 rotates in conjunction with this rotation. The first sector 60, the second sector 65, and the third sector 70 swing in given trajectories, according to the rotation of the operation pin 27, and then the shutter opening 51 is closed by the first sector 60 and the second sector 65. At this time, the first sector 60 and the third sector 70 include the engagement openings having the above-described configuration, and therefore move in a rotational area having a width narrower than a simple circular motion.

FIG. 5 is a view showing a small aperture state where the aperture blade is positioned in the shutter opening 51 for image capturing provided in the substrate 50. FIG. 5 shows the state where the rotor 2 further rotates in a clockwise direction from the state shown in FIG. 4. The operation pin 27 rotates in conjunction with this motion. The first sector 60, the second sector 65, and the third sector 70 swing in given trajectories in conjunction with the rotation of the operation pin 27. The first sector 60 and the second sector 65 move away to the positions where the shutter opening 51 is opened. Instead, the third sector 70 moves to a position where the shutter opening 51 is closed. The third sector 70 includes the aperture opening 75, and realizes the shutter opening 51 in a small aperture state. Also, at this time, the first sector 60 and the third sector 70 include the engagement openings having the above-described configuration, and moves in a rotational area having a width narrower than a simple circular motion.

Although a preferred embodiment has been described heretofore, the present invention is not limited to the above-mentioned embodiment, and other embodiments, variations and modifications may be made without departing from the scope of the present invention. In accordance with the above-described embodiment, the second sector has the conventional engagement openings. In this manner, the sector drive apparatus may employ the conventional sector together with the sector in which the configuration of the engagement openings has been changed to be driven efficiently. In addition, the sector drive apparatus may employ the sectors where the configurations of the engagement openings in all the sectors have been changed.

What is claimed is:

1. A sector drive apparatus comprising:
   a single blade sector having a first engagement opening engaged with an operation member that reciprocates in a given range and a second engagement opening engaged with a spindle fixed to a shutter substrate, the sector opening and obstructing a shutter opening formed in the shutter substrate in accordance with a movement of the operation member, wherein:
   the operation member has an operation pin that is engaged in the first engagement opening;
   the first engagement opening is substantially circular that permits the operation pin to rotate therein; and
   the second engagement opening is an elongate opening for guiding movement of the sector around the spindle.

2. An optical apparatus comprising the sector drive apparatus of claim 1.

3. The sector drive apparatus of claim 1 further comprising:
   at least a second sector comprising said first engagement opening and said second engagement opening.

4. The sector drive apparatus of claim 3 further wherein the first engagement opening of at least the second sector is substantially circular that permits the operation pin to rotate therein; and
   the second engagement opening of the second sector is an elongate opening for guiding movement of the first sector around the spindle.

5. The sector drive apparatus as claimed in claim 1, further comprising another single-blade sector that moves in a direction opposite to that in which said single blade sector moves.

6. The sector drive apparatus as claimed in claim 5, wherein said another single-blade sector opens and closes the shutter opening in cooperation with said single blade sector.

7. A sector drive apparatus comprising:
   a first sector and a second sector, each of said sectors having a first engagement opening engaged with an operation member that reciprocates in a given range and a second engagement opening engaged with a spindle fixed to a shutter substrate, said sectors opening and closing a shutter opening formed in the shutter substrate in accordance with a movement of the operation member, characterized in that:
   the operation member has an operation pin that is engaged in the first engagement opening of at least the first sector and the second sector;
   the first engagement opening of at least the first sector is substantially circular that permits the operation pin to rotate therein; and
   the second engagement opening of the first sector is an elongate opening for guiding movement of the first sector around the spindle.

8. The sector drive apparatus of claim 7 further comprising:
   the first engagement opening of at least the second sector is substantially circular that permits the operation pin to rotate therein; and
   the second engagement opening of the second sector is an elongate opening for guiding movement of the first sector around the spindle.

9. The sector drive apparatus of claim 7 further comprising:
   at least a first spindle and a second spindle;
   said first spindle being engaged with said first sector; and
   said second spindle being engaged with said second sector.

10. An optical apparatus comprising the sector drive apparatus of claim 7.

* * * * *